United States Patent
Sima

(10) Patent No.: US 9,606,510 B2
(45) Date of Patent: Mar. 28, 2017

(54) MOTOR DRIVER DEVICE WITH A HOROLOGICAL MOTOR DRIVER AND AN ASSOCIATED CONFIGURATION CIRCUIT

(71) Applicant: EM Microelectronic-Marin SA, Marin (CH)

(72) Inventor: Ovidiu Sima, Zurich (CH)

(73) Assignee: EM Microelectronic-Marin SA, Marin (CH)

( * ) Notice: Subject to any disclaimer, the term of this patent is extended or adjusted under 35 U.S.C. 154(b) by 0 days.

(21) Appl. No.: 14/863,474

(22) Filed: Sep. 24, 2015

(65) Prior Publication Data
US 2016/0098014 A1 Apr. 7, 2016

(30) Foreign Application Priority Data
Oct. 6, 2014 (EP) .................................. 14187809

(51) Int. Cl.
G04C 3/00 (2006.01)
G04C 3/14 (2006.01)
H02P 8/02 (2006.01)

(52) U.S. Cl.
CPC .............. *G04C 3/00* (2013.01); *G04C 3/143* (2013.01); *H02P 8/02* (2013.01)

(58) Field of Classification Search
CPC .. G04C 3/00; G04C 3/14; G04C 3/143; H02P 8/02
See application file for complete search history.

(56) References Cited

U.S. PATENT DOCUMENTS

| 4,218,876 | A | * | 8/1980 | Hashimoto | G04G 9/007 368/10 |
| 4,730,152 | A | * | 3/1988 | Foust | H01Q 1/103 318/266 |
| 4,829,222 | A | | 5/1989 | Hallenbeck et al. | |
| 6,172,475 | B1 | * | 1/2001 | Fitzgibbon | E05D 15/38 318/266 |
| 6,417,637 | B2 | * | 7/2002 | Fitzgibbon | E05D 15/38 318/459 |
| 6,495,983 | B1 | * | 12/2002 | Stern | G05B 19/42 318/567 |
| 6,778,065 | B1 | * | 8/2004 | Asakura | B60R 25/245 340/12.5 |

(Continued)

FOREIGN PATENT DOCUMENTS

EP 0347250 A2 6/1989

OTHER PUBLICATIONS

Extended European Search Report issued in corresponding application No. 14187809.0, completed Jun. 30, 2015 and mailed Jul. 23, 2015.

*Primary Examiner* — Amy Cohen Johnson
*Assistant Examiner* — Daniel Wicklund
(74) *Attorney, Agent, or Firm* — Oblon, McClelland, Maier & Neustadt, L.L.P.

(57) ABSTRACT

The motor driver of an horological motor consumes an important part of the electrical energy of the electronic circuit due to the fact that configuration data has to be transferred to configuration registers before each turn/step. In order to reduce the power consumption a circuitry is proposed, which detects a change in at least one of the configuration registers. This detection is used to trigger a refresh of the configuration registers only when actually a change in at least one of these configuration registers occurs.

6 Claims, 2 Drawing Sheets

(56) References Cited

U.S. PATENT DOCUMENTS

| | | | |
|---|---|---|---|
| 2006/0164452 A1* | 7/2006 | Walmsley | B41J 2/04505 347/12 |
| 2013/0082635 A1 | 4/2013 | Barth | |
| 2013/0278301 A1* | 10/2013 | Huynh | H01L 27/0255 327/110 |
| 2014/0002141 A1* | 1/2014 | Barrenscheen | H02M 1/08 327/108 |
| 2014/0125266 A1* | 5/2014 | Huynh | H02M 7/5387 318/400.27 |

* cited by examiner

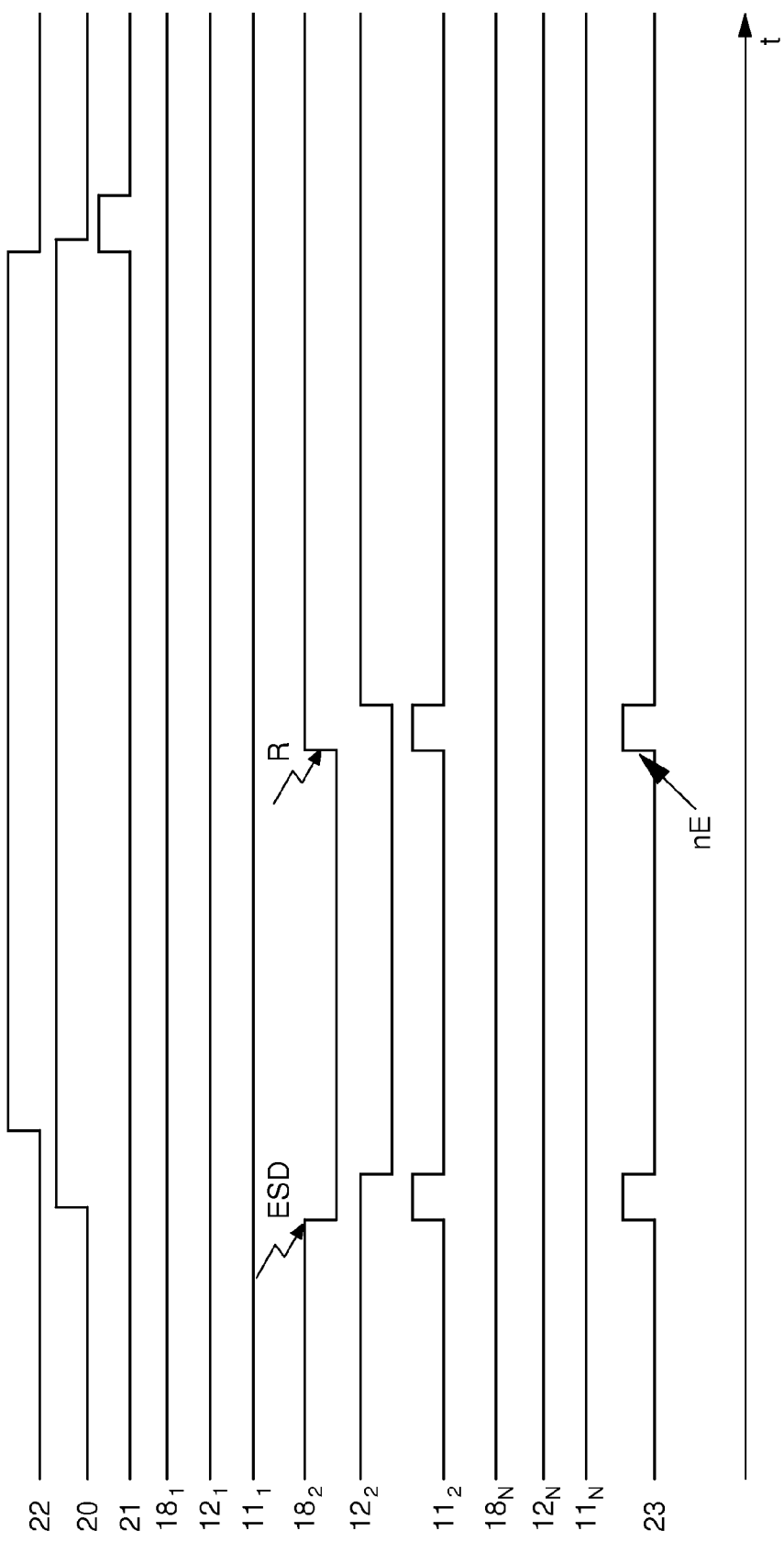

MOTOR DRIVER DEVICE WITH A HOROLOGICAL MOTOR DRIVER AND AN ASSOCIATED CONFIGURATION CIRCUIT

This application claims priority from European Patent Application no. 14187809.0 filed on Oct. 6, 2014, the entire disclosure of which is hereby incorporated herein by reference.

The present invention relates to a motor driver device with a horological motor driver and an associated configuration circuit, in particular a low power configuration circuit for a horological motor driver.

BACKGROUND OF THE INVENTION

An electronic watch with an analog display includes an electric motor which drives the time display hands. The electric motor is controlled/powered by a motor driver logic, respectively a motor driver according to configuration data stored in a set of configuration registers. An EEPROM memory content is transferred via the configuration registers as configuration data to a setup interface of the motor driver at power up and before every motor turn/step. This is done to ensure an accurate timing because the state/content of configuration registers can be influenced under particular events and therefore the content configuration registers as well as of the setup interface can be accidentally changed. A typical example of such an external event is an ESD event (Electrostatic discharge).

The motor driver of a horological motor consumes an important part of the electrical energy due to the fact that before each turn/step the transfer of the above mentioned configuration data takes place for an accurate timing because of possible ESD events or other externals electromagnetic influences.

SUMMARY OF THE INVENTION

There is a need to reduce power consumption for the controlling of a horological motor. For that purpose the present invention proposes that the transfer of the configuration data stored in the EEPROM memory into the set of configuration registers only occurs when a change of these configuration data in these configuration registers has actually occurred.

Therefore the present invention provides a motor driver device comprising a motor driver with a setup interface and a configuration circuit, the setup circuit being arranged for receiving configuration data from the configuration circuit, wherein the motor driver is arranged for controlling and powering a motor according to the configuration data, wherein the configuration circuit comprises a non-volatile memory, a memory controller and configuration registers connected the setup interface, and wherein this configuration circuit is arranged so that it is able to transfer the configuration data from the non-volatile memory via the configuration registers to the setup interface in response to a refresh signal provided by the motor driver to the memory-controller. According to the invention, the configuration circuit comprises an additional circuitry for detecting a change in the configuration registers, wherein this additional circuitry is connected to the motor driver and arranged for providing this motor driver with a change signal indicating whether a change in the configuration registers has been detected, the motor driver being arranged so that it is able to trigger the refresh signal only when the change signal indicates a change in the configuration registers.

The present invention thus allows a detection of a change of the configuration data in the configuration registers and provides a motor driver arranged for refreshing these configuration data in these configuration registers only when such a change has been detected, thus reducing considerably the power consumption of the configuration circuit of the motor driver and also of the motor driver itself.

According to an embodiment of the invention, a simple circuitry is provided for detecting a change in at least one of the configuration registers. Since this simple circuitry is preferably a combination of elementary components as delay cells and XOR-gates, the detection of a change does not consume a considerable amount of energy.

In a preferred variant, the invention proposes a simple circuit for detecting a change in any of the configuration registers, this simple circuit having a detection Flip-Flop the state of which changes if the state of any of the configuration registers has changed.

DESCRIPTION OF A PREFERRED EMBODIMENT

The working principle of the invention will now be described more in detail with reference to the accompanying drawings wherein:

FIG. 2 shows a timing diagram for refreshing the configuration data when an external event has changed at least one configuration register.

Figure 1:
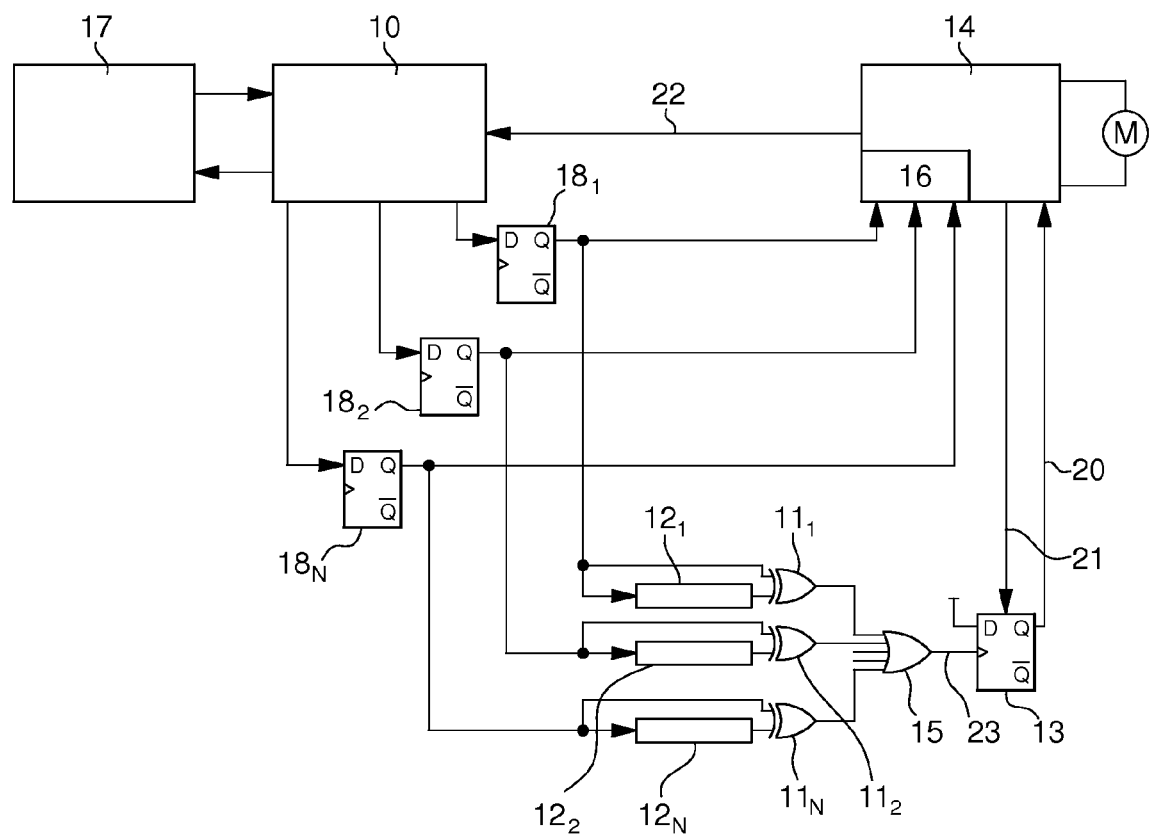
FIG. 1 shows a block diagram of the main components of a main embodiment of the invention.

Reference is made to FIG. 1. A motor M is controlled/powered by the motor driver 14. A turn/step of the motor M is dependent on the state of the setup interface 16 of the motor driver 14. A set of N lines is provided for transferring the configuration data from the configuration registers $18_1$, $18_2$, . . . , $18_N$ into the setup interface 16. The motor driver 14 comprises a output 22 to the EEPROM controller 10 for requesting an update of configuration data hold within the configuration registers. This is schematically shown in FIG. 1 but without reference numerals denoting the individual lines. Each configuration register $18_1$, $18_2$, . . . , $18_N$ is implemented in form of a flip-flop.

In order to detect a change of the content in the setup interface 16, respectively in one of the corresponding configuration registers $18_1$, $18_2$, . . . , $18_N$, each exit Q of each configuration register $18_1$, $18_2$, . . . $18_N$ is connected with an individual delay cell $12_1$, $12_2$, . . . , $12_N$ and a corresponding XOR-gate $11_1$, $11_2$, . . . , $11_N$. The exit pin of each delay cell is further connected with the corresponding XOR-gate $11_1$, $11_2$, . . . , $11_N$. The exit of each XOR-gate $11_1$, $11_2$, . . . , $11_N$ is connected with a OR-gate 15, in the following called a <<master OR-gate>> 15. This master OR-gate 15 has N entries. The exit of this master OR-gate 15 is connected with a unit called 'change detector' 13, which is also realized in form of a Flip-Flop. The exit Q of said change detector 13 provides to the motor driver 14 a change signal 20 indicating a change of the content of a configuration register $18_x$. This change signal 20 causes the motor driver 14 to forward a refresh request to the EEPROM controller 10 for updating the content of the configuration registers $18_1$, $18_2$, . . . , $18_N$. Immediately after the refreshing process, the change detector 13 is reset by the motor driver 14 providing a reset signal 21. By this reset the change detector 13 disables the change signal 20 and the change detector 13 is ready for signaling a further change in at least one of the configuration registers $18_1$, $18_2$, . . . , $18_N$.

Turning to FIG. 2 the timing diagram is as follows: Let's assume an ESD-event has an effect on the configuration register $18_2$ (The ESD-event is shown with arrow ESD in FIG. 2). The corresponding XOR-gate $11_2$ generates—due to the different inputs from the configuration register $18_2$ and the delay cell $12_2$—on its exit Q a pulse. This pulse itself causes the master OR-gate 15 to generate a pulse, which is forwarded to the change detector 13. Finally, this change detector 13 the change signal 20 to change its state thus informing the motor driver of a change in the configuration registers.

When a restore R of the original state of a corrupted configuration register occurs, this event generates also a logical '1' signal 23 at the exit of the master OR-gate 15. However this has no effect (nE), since the change signal 20 is already at "1".

The number N of bits forming the configuration registers $18_1$, $18_2$, ..., $18_N$ is dependent on the complexity of the tasks of the motor driver 14. For a so called simple motor driver, N is typically 16. For more sophisticated motor driver which compensates additionally e.g. thermo effects or shock detection the number N goes up to 512.

For the implementation the motor driver 14 has to be slightly modified with two additional pins for the change signal 20 and the clear/reset signal 21 for clearing/resetting the change detector 13.

The invention is not limited to the proposed circuitry, other logical equivalent solutions are suitable as well. Also the configuration registers $18_1$, $18_2$, ..., $18_N$ need not to be implemented as Flip-Flops; however Flip-Flops represent a preferred component for these configuration registers.

LIST OF REFERENCE SIGNS, GLOSSARY

10 EEPROM-controller, memory-controller
11; $11_1$, $11_2$, ..., $11_N$ XOR-gates
12; $12_1$, $12_2$, ..., $12_N$ delay cells
13 change detector
14 motor driver
15 OR-gate; Master OR-gate
16 setup interface
17 EEPROM memory, non-volatile memory
18; $18_1$, $18_2$, ..., $18_N$ configuration registers
20 change signal
21 clear/reset signal
22 refresh signal
23 exit signal of the master OR-gate
EEPROM Electrically Erasable Programmable Read-Only Memory
ESD Electro-Static Discharge
M motor
N number of the configuration registers
nE no effect
R Restoring the content of configuration register 18

What is claimed is:

1. A motor driver device comprising a horological motor driver with a setup interface and a configuration circuit, the setup interface being arranged for receiving configuration data from the configuration circuit, wherein the horological motor driver is arranged for controlling and powering a motor according to the configuration data, wherein the configuration circuit comprises a non-volatile memory, a memory controller and configuration registers connected the setup interface, this configuration circuit being arranged so that it is able to transfer the configuration data from the non-volatile memory via the configuration registers to the setup interface in response to a refresh signal provided by the horological motor driver to the memory-controller;

wherein the configuration circuit comprises an additional circuitry for detecting a change in the configuration registers, wherein this additional circuitry is connected to the horological motor driver and arranged for providing this horological motor driver with a change signal indicating whether a change in the configuration registers has been detected, the horological motor driver being arranged so that it is able to trigger the refresh signal only when said change signal indicates a change in the configuration registers.

2. The motor driver device according to claim 1, wherein the additional circuitry comprises for each configuration register a delay cell and a XOR-gate, wherein each XOR-gate is connected with the corresponding configuration register and the corresponding delay cell, and wherein the exit of each XOR-gate is connected with a master OR-gate for indicating said change in the configuration registers.

3. The motor driver device according to claim 2, wherein the additional circuitry comprises further a change detector which is connected with the exit of the master OR-gate arranged for triggering this change detector which is arranged for generating said signal change.

4. The motor driver device according to claim 3, wherein the change detector is formed by a Flip-Flop which can be reset by a clear/reset signal sent by the horological motor driver after a transfer of the configuration data stored in the non-volatile memory into the configuration registers has been performed.

5. The motor driver device according to claim 1, wherein the memory controller is arranged in between the configuration registers and the non-volatile memory.

6. The motor driver device according to claim 1, wherein the configuration registers are implemented as Flip-Flops.

* * * * *